(12) United States Patent
Nitta

(10) Patent No.: US 6,330,434 B1
(45) Date of Patent: Dec. 11, 2001

(54) MOBILE COMMUNICATION SYSTEM CAPABLE OF BEING CONNECTED TO WIRELESS LINE ONLY DURING ACTUAL DATA COMMUNICATION

(75) Inventor: Yoshio Nitta, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/199,155

(22) Filed: Nov. 25, 1998

(30) Foreign Application Priority Data

Nov. 27, 1997 (JP) .................................................. 9-326413

(51) Int. Cl.$^7$ ....................................................... H04M 1/00
(52) U.S. Cl. ........................... 455/403; 455/434; 455/575
(58) Field of Search .................................... 455/553, 557, 455/435, 436, 31.3, 575, 403, 434

(56) References Cited

U.S. PATENT DOCUMENTS

| | | | |
|---|---|---|---|
| 5,933,763 | * | 8/1999 | Wang et al. ........................ 435/31.3 |
| 6,061,564 | * | 5/2000 | Akeda .................................... 455/435 |
| 6,108,546 | * | 8/2000 | Kusaki et al. ........................ 455/436 |
| 6,157,845 | * | 12/2000 | Henry et al. .......................... 455/553 |
| 6,169,909 | * | 1/2001 | Koshino ................................ 455/557 |

* cited by examiner

*Primary Examiner*—Zarni Maung
*Assistant Examiner*—Jungwon Chang
(74) *Attorney, Agent, or Firm*—Foley & Lardner

(57) ABSTRACT

While the presently operable communication infrastructure is used, a wireless line is connected only during data transmission/reception. When no data is transmitted/received between an information processing terminal and a mobile station, a wireless line connection control apparatus instructs to the mobile station that the wireless line is interrupted. When a protocol quasi-terminating apparatus detects that the line is interrupted, this protocol quasi-terminating apparatus quasi-terminates the protocol in order that a logical link established between the communication network and the mobile station is not disconnected. As a result, the wireless line can be connected only when the data is transmitted/received without requiring user's operation.

8 Claims, 6 Drawing Sheets

MOBILE COMMUNICATION SYSTEM CAPABLE OF BEING CONNECTED TO WIRELESS LINE ONLY DURING ACTUAL DATA COMMUNICATION

BACKGROUND OF THE INVENTION

1. Field of the Invention

The present invention is generally related to a mobile communication system. More specifically, the present invention is directed to a mobile communication system in which while an information (data) processing terminal is connected to a mobile station (portable telephone), data is communicated between this information processing terminal and an information processing center connected to a switching station.

2. Description of the Related Art

Generally speaking, when a data communication is carried out in a mobile communication system, especially when a data communication is performed in the presently available automobile telephone communication system, this data communication is carried out in a line switching base. However, in the case that the data is communicated in the line switching base, a mobile station (telephone) continuously captures a wireless (radio) line. As a result, while this mobile station executes the data communication, even in a lengthy time period during which the data is not actually transmitted/received, since the mobile station continuously captures the wireless line, the user of this mobile station must pay unnecessary data communication fee due to such a useless rest time period. On the other hand, in view of a total frequency utilizing efficiency, it is not preferable for communication providers when not actually communicated time occurs.

To solve such a useless time problem, one solution has been proposed, namely a data communication executed by a wireless packet communication. However, in order to actually use this packet communication system, the communication providers are required to considerably renew/additionally employ the facilities in the base stations in the service area. On the other hand, the users must newly purchase mobile stations adapted to this packet communication service.

The above-explained conventional mobile communication system owns the following problems:

(1). While executing the data communication, even when such a lengthy time period that the data is not actually transmitted/received is produced, since the mobile station continuously captures the wireless line, such useless time charge is charged to the user who should accordingly pay the unwanted communication fee.

(2). To utilize the above-explained wireless packet communication, the presently available communication infrastructure such as the base station must be largely renewed/added.

SUMMARY OF THE INVENTION

An object of the present invention is to provide a mobile communication system capable of connecting a line only while data is actually transmitted/received under such a condition that a mobile station purchased and presently operated by a user is utilized while the presently available communication infrastructure can be directly used without any modifications. To achieve the above-described object, a mobile communication system, according to an aspect of the present invention, is featured by comprising:

an information processing center apparatus;

a switching station for controlling a connection of a wireless line;

a communication network for connecting the information processing center apparatus to the switching station;

a protocol quasi-terminating apparatus provided between the communication network and the switching station, for detecting as to whether or not a line connected between the communication network and the switching station is interrupted, and for quasi-terminating a protocol used to the communication network, and another protocol used to the mobile station in the case that the line is interrupted;

a mobile station for performing a data communication via the wireless line between the switching station and the own mobile station;

an information processing terminal for transmitting/receiving data between the information processing center apparatus and the own information processing terminal; and a wireless line connection control apparatus provided between the mobile station and the information processing terminal, for transferring to the mobile station such an instruction to interrupt the wireless line between the switching station and the mobile station in the case that no data is transmitted/received between the information processing terminal and the mobile station; and also for transferring to the mobile station such an instruction to connect the interrupted wireless line in the case that the data transmission/reception is commenced between the information processing terminal and the mobile station.

In the mobile communication system of the present invention, when no data is transmitted/received between the information processing terminal and the mobile station, the wireless line connection control apparatus instructs the mobile station to interrupt the wireless line. When the protocol quasi-terminating apparatus detects that the line is interrupted, this protocol quasi-terminating apparatus quasi-terminates the protocol in order not to cut the logical link with the communication network.

As a consequence, the line can be connected only when the data is actually transmitted/received without requiring the user's operation.

Also, a mobile communication system, according to another aspect of the present invention, is featured by that the wireless line connection control apparatus includes:

a transmit/receive data monitoring unit for duplicating data transmitted/received between the information processing terminal and the mobile station to output the duplicated data, and for transferring a line interrupt/connect instruction to the mobile station when the line interrupt/connect instruction is received;

a data communication present/not present judging unit for judging as to whether or not there is such transmit/receive data duplicated by the transmit/receive data monitoring unit; and a line connect/interrupt instructing unit for transmitting a line interrupt instruction to the transmit/receive data monitoring unit in the case that the detection result of the data communication present/not present judging unit indicates that no transmit/receive data is present; and also for transmitting a line connect instruction to said transmit/receive data monitoring unit in the case that the detection result of the data communication present/not present judging unit indicates that the transmit/receive data is present.

Furthermore, a mobile communication system, according to another aspect of the present invention, is featured by that the protocol quasi-terminating apparatus includes:

a mobile station-sided protocol terminating unit for detecting as to whether or not the line between the communication network and the switching station is interrupted, and also for quasi-terminating a protocol used to the mobile station when a protocol termination instruction is entered to the mobile station sided protocol terminating unit; a communication network-sided protocol terminating unit for quasi-terminating a protocol used to the communication network when a protocol termination instruction is entered into the communication network-sided protocol terminating unit; and a protocol terminating/matching control unit for transmitting a protocol termination instruction to both the communication network-sided protocol terminating unit and the mobile station-sided protocol terminating unit in the case that the detection result of the mobile station-sided protocol terminating unit indicates that the line is interrupted.

Also, according to another aspect of the present invention, another wireless line connection control apparatus having a similar arrangement to that of the wireless line connection control apparatus is further provided between the switching station and the protocol quasi-terminating apparatus.

In the mobile communication system of the present invention, since another wireless line connection control apparatus having the similar arrangement to that of the wireless line connection control apparatus is further provided between the switching station and the protocol quasi-terminating apparatus, the interrupt/re-connect operation of the wireless line can be executed on the side of the switching station.

Furthermore, according to another aspect of the present invention, another protocol quasi-terminating apparatus having an arrangement similar to that of the protocol quasi-terminating apparatus is further provided between the information processing terminal and the wireless line connection control apparatus.

In this embodiment, since another protocol quasi-terminating apparatus having the arrangement similar to that of the protocol quasi-terminating apparatus is further provided between the information processing terminal and the wireless line connection control apparatus, the protocol used in the wireless section can be independently set irrespect to the sort of the communication protocol used between the information processing terminal and the information processing center apparatus.

BRIEF DESCRIPTION OF THE DRAWINGS

For a better understanding of the present invention, reference may be made to the accompanying drawings, in which.

DETAILED DESCRIPTION OF THE PREFERRED EMBODIMENTS

Figure 1:
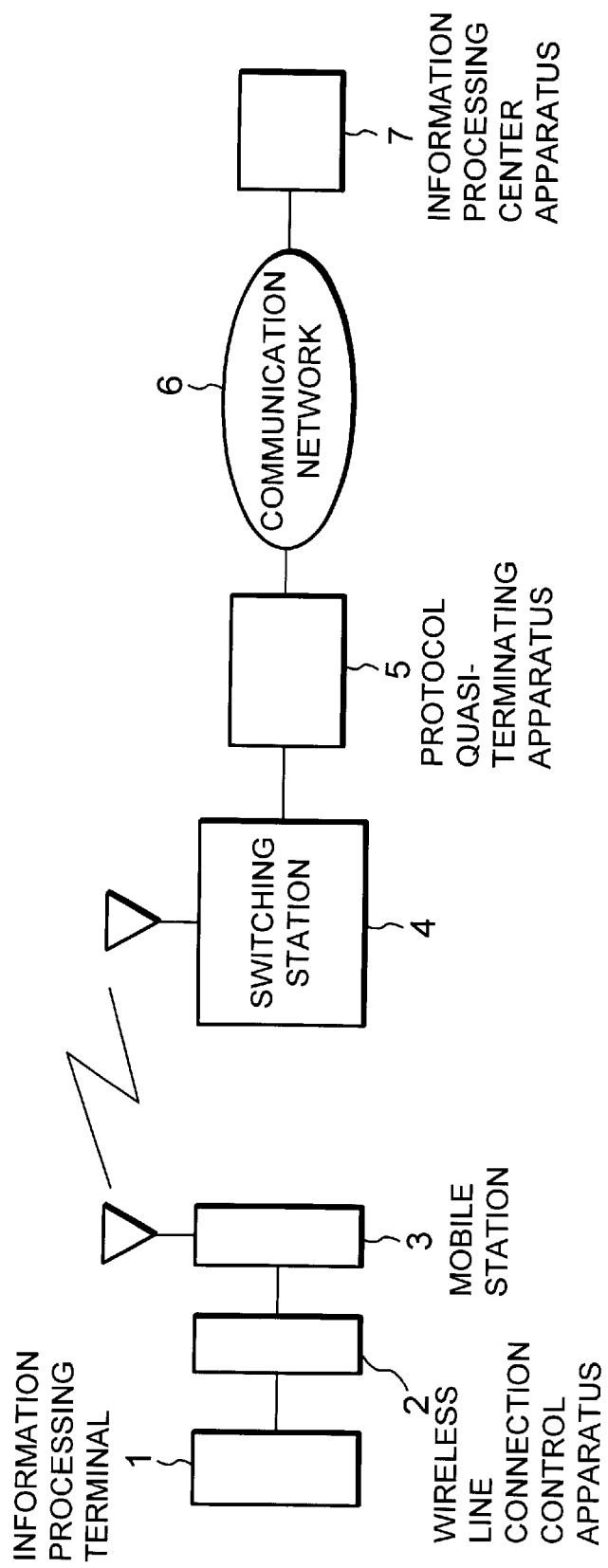
FIG. 1 is a simplified schematic arrangement of a mobile communication system according to a first embodiment of the present invention.

Referring now to the drawings, various preferred embodiment of the present invention will be described in detail.

Arrangement of First of Mobile Communication System

FIG. 1 schematically indicates an overall arrangement of a mobile communication system according to a first preferred embodiment of the present invention.

As indicated in FIG. 1, the mobile communication system according to this first embodiment is arranged by an information processing terminal 1, a wireless line connection control apparatus 2, a mobile station 3, a switching station 4, a protocol quasi-terminating apparatus 5, a communication network 6, and an information processing center apparatus 7.

The information processing terminal 1 corresponds to such a terminal used by a user through a wireless line. The user may transmit and/or receive data between this information processing terminal 1 and the information processing center apparatus 7. As a concrete example, the information processing terminal 1 corresponds to a personal computer, a PDA (Personal Digital Assistants) terminal, and so on.

The wireless line connection control apparatus 2 corresponds to an adaptor apparatus for connecting the information processing terminal 1 to the mobile station 3. While this wireless line connection control apparatus 2 is provided between the mobile station 3 and the information processing terminal 1, in such a case that no data is transmitted/received between the information processing terminal 1 and the mobile station 3, this wireless line connection control apparatus 2 issues an instruction to the mobile station 3 such that a wireless line established between this mobile station 3 and the switching station 4 is disconnected. Conversely, in the case that the data transmission/reception operation is commenced between the information processing terminal 1 and the mobile station 3, this wireless line connection control apparatus 2 issues an instruction to the mobile station 3 such that the interrupted wireless line is connected.

The mobile station 3 owns the following functions. That is, a data communication is carried out between this mobile station 3 and the switching station 4 via a wireless line, so that this mobile station 3 is connected to the information processing center apparatus 7 existed in a destination of the communication network 6. Also, concretely speaking, the mobile station 3 corresponds to a portable telephone apparatus of an automobile telephone system, and a portable telephone apparatus of the PHS system.

The switching station 4 controls connections of wireless lines between this switching station 4 and a plurality of mobile stations 3. Concretely speaking, the switching station 4 corresponds to a switching system of an automobile telephone, and a switching system of the PHS system.

The communication network 6 is used to connect the information processing center apparatus 7 with the switching station 4. Concretely speaking, this communication network 6 corresponds to a general-purpose public line network, and a private line.

The protocol quasi-terminating apparatus 5 is provided between the communication network 6 and the switching station 4 so as to detect as to whether or not the communication line connected between the communication network 6 and the switching station 4 is interrupted. When this communication line is interrupted, the protocol terminating apparatus 5 quasi-terminates a protocol used with the communication network 6, and also another protocol used with the mobile station 3. As explained above, the protocol quasi-terminating apparatus 5 is such an apparatus having a function capable of quasi-terminating a protocol on the side of the switching station 4 in order that even when a communication line is interrupted, a logical link with a communication counter party is not interrupted.

The information processing center apparatus 7 corresponds to a center apparatus for communicating information with the information processing terminal 1. Concretely speaking, the information processing terminal 7 corresponds to various sorts of VAN systems provided by personal computer communication industries, various sorts of the Internet service providers, and computer systems installed in general offices. As to a small-scaled information processing center apparatus, home-use personal computers and office-use personal computers may be employed. Also, personal computers connected via wireless lines to portable telephones may be employed.

Internal Arrangement of Wireless Line Connection Control Apparatus

Figure 2:
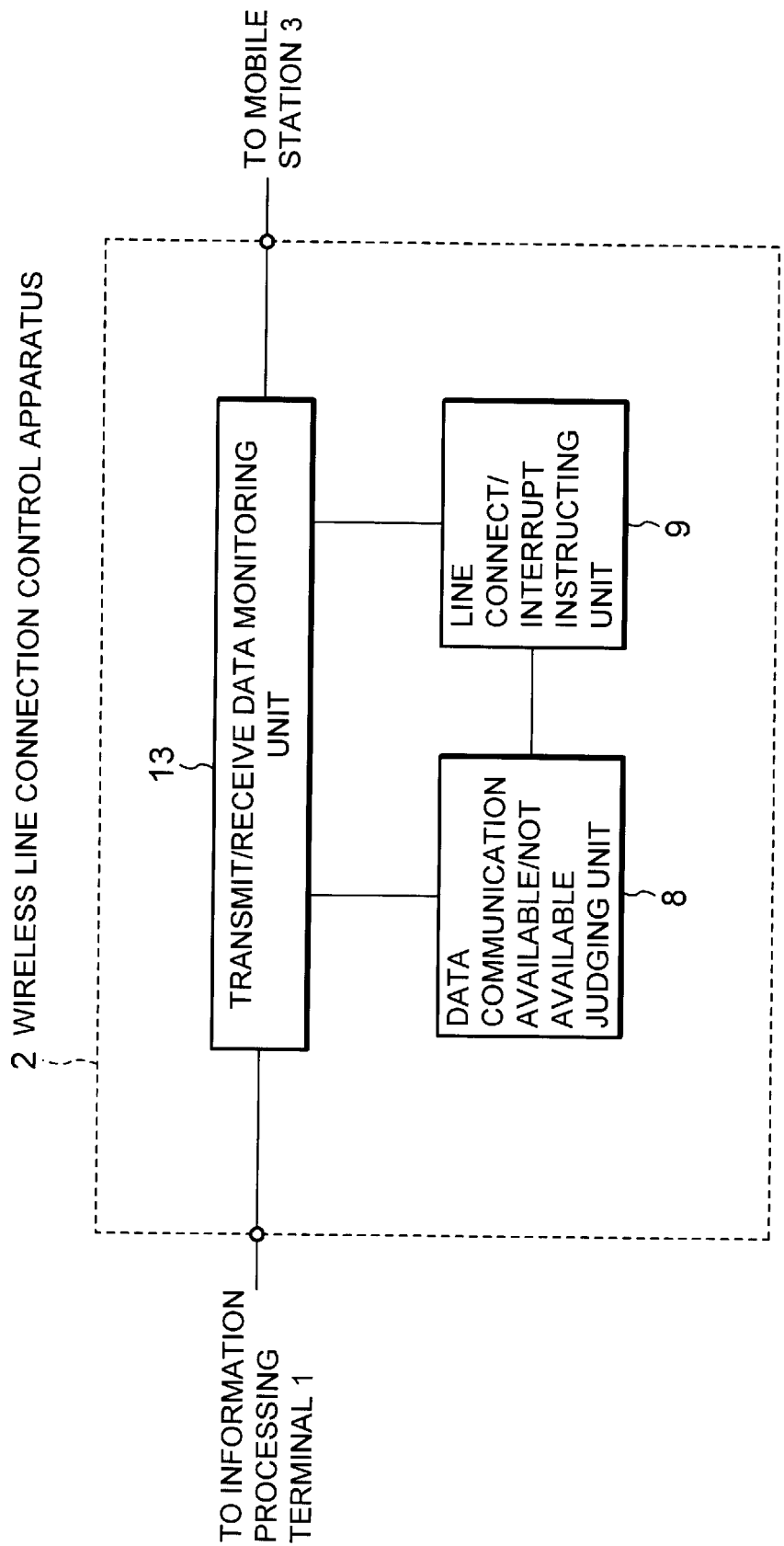
FIG. 2 is a block diagram for schematically indicating an internal arrangement of a wireless line connection control apparatus 2 employed in the mobile communication system of FIG. 1.

FIG. 2 is a block diagram for schematically showing an internal arrangement of the wireless line connection control apparatus 2 employed in the above-explained mobile communication system of FIG. 1.

As indicated in this drawing, the wireless line connection control apparatus 2 is arranged by a transmit/receive data monitoring unit 13, a data communication present/not present judging unit 8, and a line connect/interrupt instructing unit 9.

The transmit/receive data monitoring unit 13 owns such a function that this transmit/receive data monitoring unit 13 monitors data transmitted/received between the information processing terminal 1 and the mobile station 3, and transfers a duplication of communication data to the data communication present/not present judging unit 8 in real time. Further, the transmit/receive data monitoring unit 13 receives either a line interrupt instruction or a line connection instruction issued from the line connect/interrupt instructing unit 9, and then transfers the received instruction to the mobile station 3.

The data communication present/not present judging unit 8 has a function capable of judging as to whether or not the data transmission/reception is carried out between the information processing terminal 1 and the mobile station 3, and also capable of transferring the judgement result to the line connection interrupt instructing unit 9.

The line connection connect/interrupt instructing unit 9 owns the following function. That is, while receiving data communication state information issued from the data communication present/not present judging unit 8, or the connect/interrupt instructions issued via the switching station 4 from the data communication present/not present judging unit 8, this line connect/interrupt instructing unit 9 transfers either a line connect instruction or a line interrupt instruction to the transmit/receive data monitoring unit 13.

Internal Arrangement of Protocol Quasi-Terminating Apparatus 5

Figure 3:
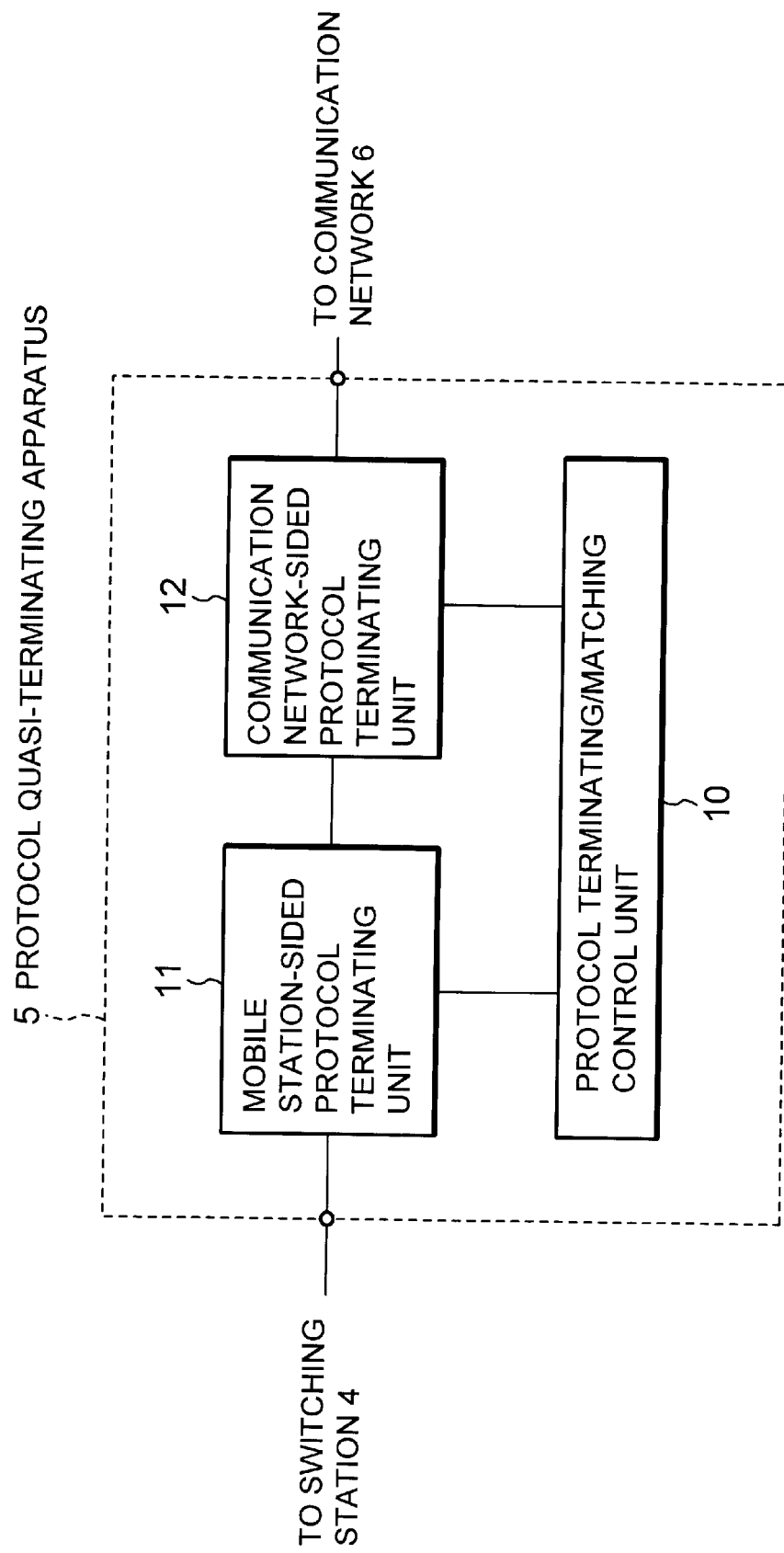
FIG. 3 is a block diagram for schematically representing an internal arrangement of a protocol quasi-terminating apparatus 5 employed in the mobile communication system of FIG. 1.

FIG. 3 is a block diagram for schematically showing an internal arrangement of the protocol quasi-terminating apparatus 5 employed in the mobile communication system of FIG. 1.

As indicated in this drawing, the protocol quasi-terminating apparatus 5 is arranged by a mobile station-sided protocol terminating unit 11, a communication network-sided protocol terminating unit 12, and a protocol terminating/matching control unit 10.

The mobile station-sided protocol terminating unit 11 detects as to whether or not a communication line between the communication network 6 and the switching station 4 is interrupted, and quasi-terminates a protocol used with the mobile station 3 when a protocol termination instruction issued from the protocol terminating/matching control unit 10 is entered into this mobile-sided protocol terminating unit 11.

The communication network-sided protocol terminating unit 12 quasi-terminates a protocol used with the communication network when a protocol termination instruction issued from the protocol terminating/matching control unit 10 is entered into this communication network-sided protocol terminating unit 12.

The protocol terminating/matching control unit 10 transmits a protocol termination instruction to both the communication network-sided protocol terminating unit 12 and the mobile station-sided protocol terminating unit 11 in such a case that a detection result made by the mobile station-sided protocol terminating unit 11 indicates the line interruption.

As previously explained, the communication network-sided protocol terminating unit 12 executes the quasi-protocol termination, so that the protocol can be matched in such a manner that the communication link with the information processing center apparatus 7 connected via the communication network 6 is maintained.

Operations of First Mobile Communication System

Referring now to flow charts of FIG. 4 and FIG. 5, operations of the mobile communication system according to the first embodiment of the present invention will be described in detail.

Figure 4:
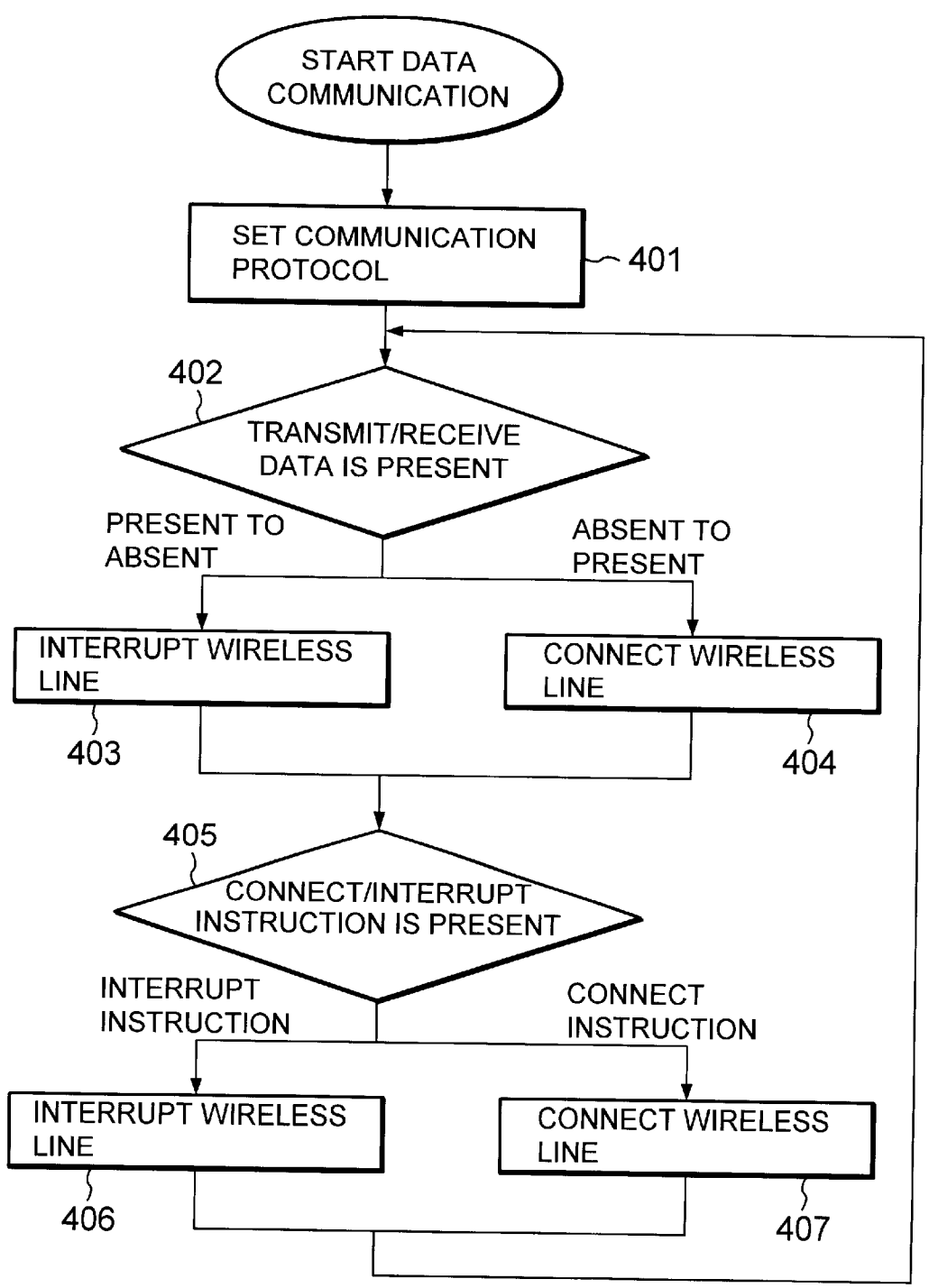
FIG. 4 is a flow chart for describing operations of the wireless line connection control apparatus 2.

FIG. 4 is a flow chart for mainly explaining operations of the wireless line connection control apparatus 2 indicated in FIG. 2.

In the first mobile communication system of FIG. 1, the information processing terminal 1 first commences the data communication via the wireless system. Next, this information processing terminal 1 notifies a sort of a communication protocol used to the information processing center apparatus 7 to the protocol quasi-terminating apparatus 5 in accordance with a preselected sequence/protocol (step 401). The information processing terminal 1 communicates with this information processing center apparatus 7 via the communication network 6. This preselected sequence/protocol may be realized as the presently available sequence/protocol, or a sequence/protocol specifically designed to this mobile communication system. This notified information constitutes information required to determine a sort of a communication protocol used to quasi-terminate with respect to the communication network 6 by the protocol quasi-terminating apparatus 5.

Then, the transmit/receive data monitoring unit 13 shown in FIG. 2 monitors transmit/receive flows of communication data, and duplicates the transmit/receive data to transfer the duplicated transmit/receive data to the data communication present/not present judging unit 8. The data communication present/not present judging unit 8 judges as to whether or not the duplicated transmit/receive data is present, and then transfer the judgement result to the line connect/interrupt instructing unit 9 (step 402). When the data communication present/not present judging unit 8 judges as to whether or not the duplicated transmit/receive data is present, this data communication present/not present judging unit 8 judges that there is no duplicated transmit/receive data in such a case that the data transmission/reception is not carried out during a preselected time interval. In the data communication present/not present judging unit 8, a timer operation is performed so as to execute this data judgment. It should also be noted that this preset time interval, namely the timer value may be solely determined by the mobile communication system shown in FIG. 1, or may be registered into the system for every communication of the information processing terminal 1 so as to be managed and executed by the system.

Next, in the case that the communication condition is changed from the data transmit/receive state to the no data transmit/receive state, the line connect/interrupt instructing unit 9 performs the line interrupt on the mobile station 3 via the transmit/receive data monitoring unit 13 (step 403). Conversely, in the case that the communication condition is changed from the no data transmit/receive state to the data transmit/receive state, the line connect/interrupt instructing unit 9 performs the line connection on the mobile station 3 via the transmit/receive data monitoring unit 13 (step 404).

Also, as a protocol monitoring result, the protocol quasi-terminating apparatus 5 outputs the line connect/interrupt instruction. Then, the line connect/interrupt instructing unit 9 receives this line connect/interrupt instruction via the switching station 4, and thereafter executes interruption of the wireless line (step 406), or connection of the wireless line (step 407) by judging this instruction and the communication condition (step 405).

Figure 5:
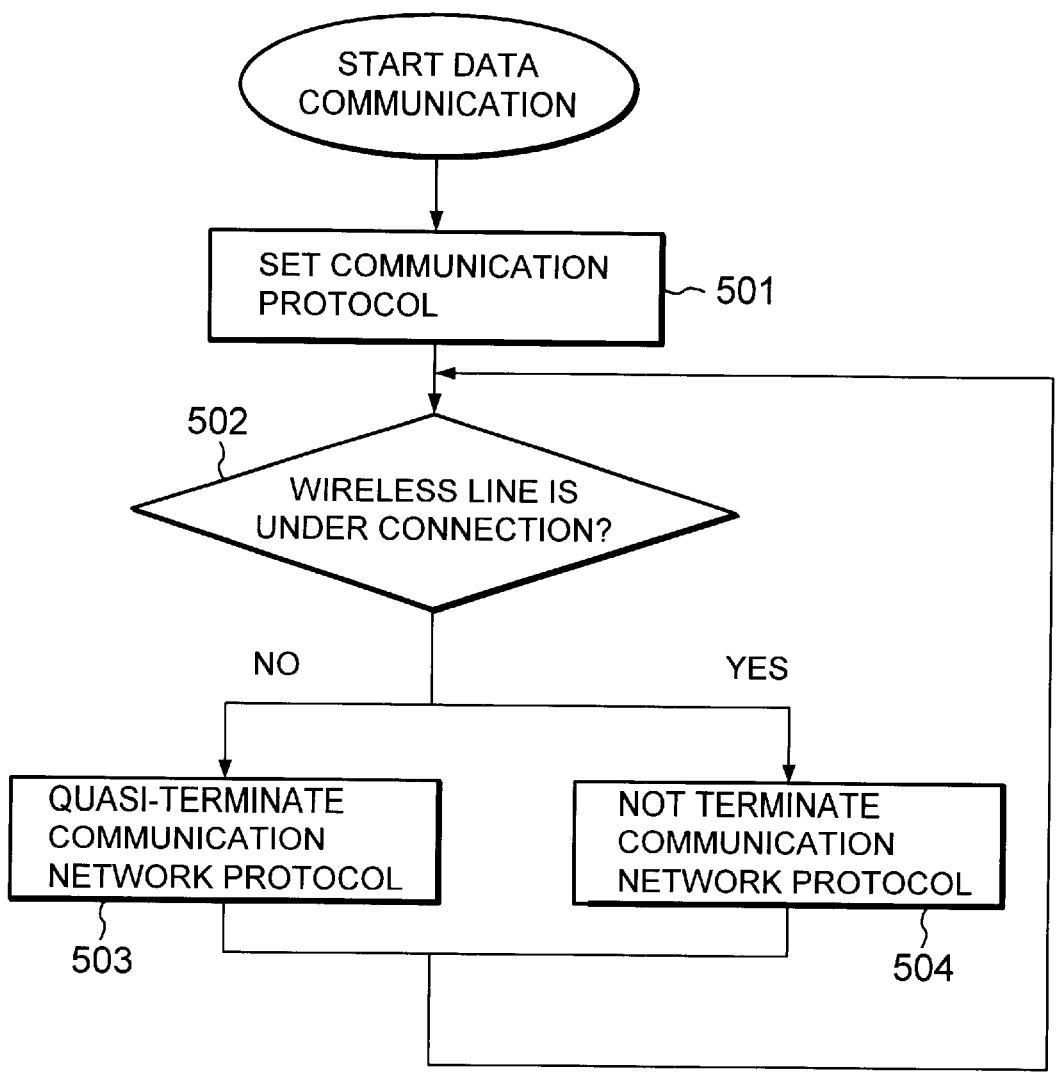
FIG. 5 is a flow chart for describing operations of the protocol quasi-terminating apparatus 5.

FIG. 5 is a flow chart for mainly describing operations of the protocol quasi-terminating apparatus 5.

First, the information processing terminal 1 commences the data communication via the wireless line by utilizing the mobile communication system shown in FIG. 1.

Similar to the above-described operation, the information processing terminal 1 notifies a sort of a communication protocol with respect to the communication network 6 to the protocol quasi-terminating apparatus 5. The protocol quasi-terminating apparatus 5 determines a communication protocol with respect to the communication network 6 during the quasi-terminating operation on the basis of this notified information (step 501).

The mobile station-sided protocol terminating unit 11 judges as to whether or not the wireless line is being connected by the communication data transmit/receive condition, and then notifies this judgment result to the protocol terminating/matching control unit 10 (step 502). The protocol terminating/matching control unit 10 judges as to whether or not the communication protocol should be quasi-terminated on the basis of this notified information. In the case that the wireless line is not under connection, the protocol terminating/matching control unit 10 outputs an instruction of a quasi-terminating operation to the communication network-sided protocol terminating unit 12 in order to quasi-terminate the protocol of the communication network and not to interrupt the communication link (step 503). In the case that the wireless line is being connected, the protocol terminating/matching control unit 10 issues an instruction to the communication network-sided protocol terminating unit 12 in such a manner that the communication data can be equally transmitted/received with respect to the communication in order not to enter into the protocol of the communication network (step 504).

In accordance with the mobile communication system of the first embodiment, the wireless line is automatically interrupted and reconnected by the monitoring result of the data transmit/receive condition executed via the wireless line. AS a consequence, the sequential operation for interrupting/connecting the wireless line can be automatically accomplished, which can avoid cumbersome operation by the user.

Also, in the first embodiment, the protocol quasi-terminating apparatus 5 is provided on the side of the communication network, and judges as to whether or not the protocol of the communication network 6 should be terminated on the basis of the monitoring result of the connection condition for the wireless section to automatically quasi-terminate this protocol. As a consequence, even when the wireless line is interrupted, while the logical link established with the communication counter party is not interrupted, the wireless line can be interrupted.

Arrangement of Second Mobile Communication

Subsequently, a mobile communication system according to a second embodiment of the present invention will now be described with reference to a drawing.

Figure 6:
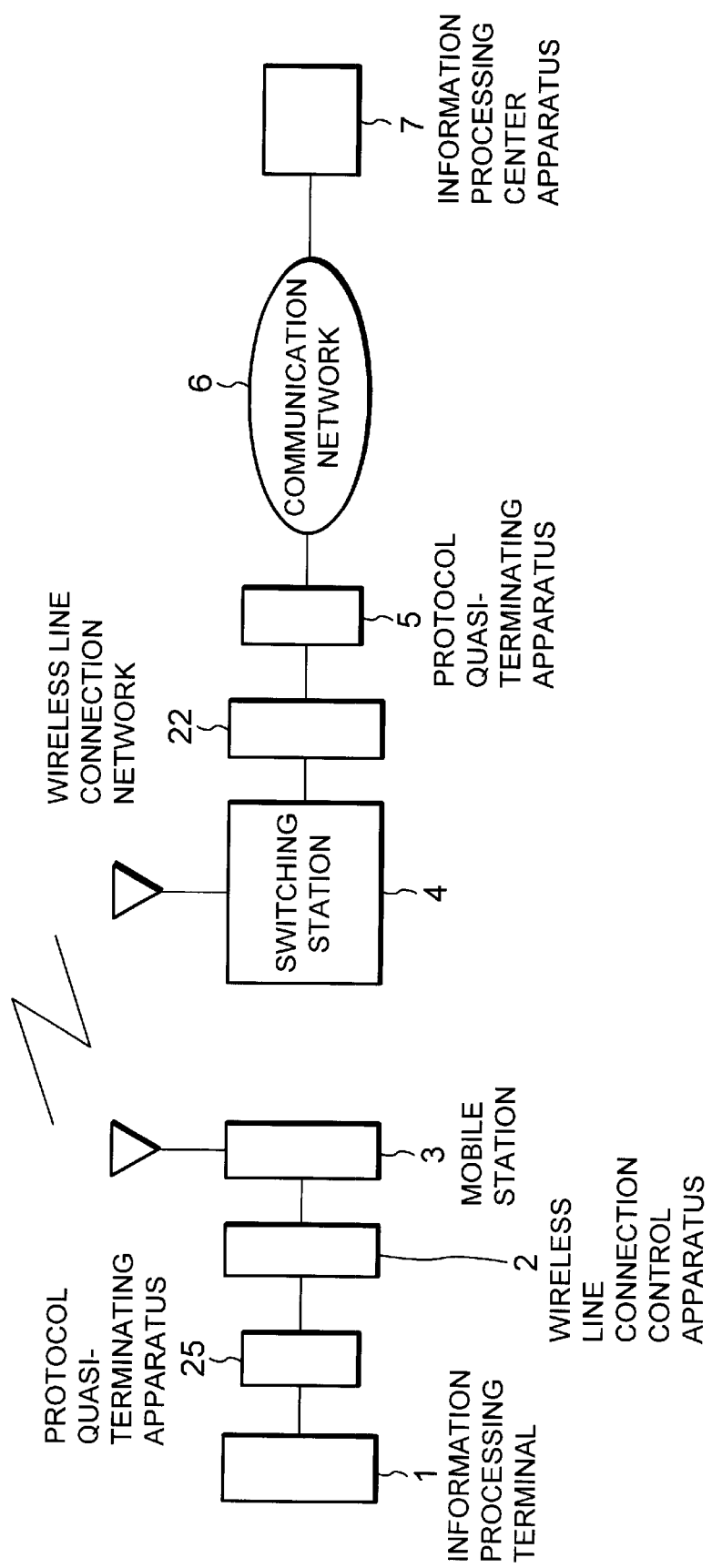
FIG. 6 is a simplified schematic arrangement of a mobile communication system according to a second embodiment of the present invention.

FIG. 6 is a block diagram for schematically indicating an arrangement of the mobile communication system according to the second embodiment of the present invention.

The mobile communication system of this second embodiment is arranged such that as to the above-described mobile communication system of the first embodiment shown in FIG. 1, another protocol quasi-terminating apparatus 25 is provided between the information processing terminal 1 and a wireless line connection control apparatus 2, and also a wireless line connection control apparatus 22 is provided between a switching station 4 and a protocol quasi-terminating apparatus 5.

The protocol quasi-terminating apparatus 25 owns an arrangement similar to that of the protocol quasi-terminating apparatus 5, and also the wireless line connection control apparatus 22 has an arrangement similar to that of the wireless line connection control apparatus 2.

In this second embodiment, since the protocol quasi-terminating apparatus 25 is employed, there is such a merit that a protocol used in a wireless section can be independently set irrespective of a sort of a communication protocol used between the information processing terminal 1 and an information processing center apparatus 7.

Also, in accordance with this second embodiment, since the wireless line connection control apparatus 22 is employed, there is another merit that the interrupt/reconnect operations of the wireless line can be performed on the side of the switching station 4.

As previously described in detail, the mobile communication system according to the present invention can achieve the below-mentioned effects:

(1). The wireless line is automatically interrupted and reconnected based upon the monitoring result of the data transmit/receive condition executed via the wireless line. AS a consequence, the sequential operation for interrupting/connecting the wireless line can be automatically accomplished and kept away from the user's sight, which can avoid cumbersome operation by the user.

(2). The protocol quasi-terminating function is provided on the side of the communication network, and judges as to whether or not the protocol of the communication network should be terminated based upon the monitoring result of the connection condition for the wireless section to automatically quasi-terminate this protocol. As a consequence, even when the wireless line is interrupted, while the logical link established with the communication counter party is not interrupted, the protocol can be quasi-terminated on the side of the communication network.

What is claimed is:

1. A mobile communication system comprising:

an information processing center apparatus;

a switching station for controlling a connection of a wireless line;

a communication network for connecting said information processing center apparatus to said switching station;

a mobile station for performing a data communication via the wireless line between said switching station and the own mobile station;

a protocol quasi-terminating apparatus provided between said communication network and said switching station, for detecting as to whether or not a line connected between said communication network and said switching station is interrupted, and for quasi-terminating a protocol used to said communication network, and another protocol used to said mobile station in the case that said line is interrupted;

an information processing terminal for transmitting/receiving data between said information processing center apparatus and the own information processing terminal; and a wireless line connection control apparatus provided between said mobile station and said information processing terminal, for transferring to said mobile station an instruction to interrupt the wireless line between said switching station and said mobile station in the case that no data is transmitted/received between said information processing terminal and said mobile station, and also for transferring to said mobile station an instruction to connect said interrupted wireless line in the case that the data transmission/reception is commenced between said information processing terminal and said mobile station, wherein said protocol quasi-terminating apparatus includes:

a mobile station-sided protocol terminating unit for judging as to whether or not the line between said communication network and said switching station is interrupted, and also for quasi-terminating a protocol used to said mobile station when a protocol termination instruction is entered to said mobile station sided protocol terminating unit;

a communication network-sided protocol terminating unit for quasi-terminating a protocol used to said communication network when a protocol termination instruction is entered into said communication network-sided protocol terminating unit; and a protocol terminating/matching control unit for transmitting a protocol termination instruction to both said communication network-sided protocol terminating unit and said mobile station-sided protocol terminating unit in the case that the detection result of said mobile station-sided protocol terminating unit indicates that the line is interrupted.

2. A mobile communication system comprising:

an information processing center apparatus;

a switching station for controlling a connection of a wireless line;

a communication network for connecting said information processing center apparatus to said switching station;

a mobile station for performing a data communication via the wireless line between said switching station and the own mobile station;

a protocol quasi-terminating apparatus provided between said communication network and said switching station, for detecting as to whether or not a line connected between said communication network and said switching station is interrupted, and for quasi-terminating a protocol used to said communication network, and another protocol used to said mobile station in the case that said line is interrupted;

an information processing terminal for transmitting/receiving data between said information processing center apparatus and the own information processing terminal; and a wireless line connection control apparatus provided between said mobile station and said information processing terminal, for transferring to said mobile station an instruction to interrupt the wireless line between said switching station and said mobile station in the case that no data is transmitted/received between said information processing terminal and said mobile station, and also for transferring to said mobile station an instruction to connect said interrupted wireless line in the case that the data transmission/reception is commenced between said information processing terminal and said mobile station, wherein another wireless line connection control apparatus having a similar arrangement to that of said wireless line connection control apparatus is further provided between said switching station and said protocol quasi-terminating apparatus.

3. A mobile communication system comprising:

an information processing center apparatus;

a switching station for controlling a connection of a wireless line;

a communication network for connecting said information processing center apparatus to said switching station;

a mobile station for performing a data communication via the wireless line between said switching station and the own mobile station;

a protocol quasi-terminating apparatus provided between said communication network and said switching station, for detecting as to whether or not a line connected between said communication network and said switching station is interrupted, and for quasi-terminating a protocol used to said communication network, and another protocol used to said mobile station in the case that said line is interrupted;

an information processing terminal for transmitting/receiving data between said information processing center apparatus and the own information processing terminal; and a wireless line connection control apparatus provided between said mobile station and said information processing terminal, for transferring to said mobile station an instruction to interrupt the wireless line between said switching station and said mobile station in the case that no data is transmitted/received between said information processing terminal and said mobile station, and also for transferring to said mobile station an instruction to connect said interrupted wireless line in the case that the data transmission/reception is commenced between said information processing terminal and said mobile station, wherein another protocol quasi-terminating apparatus having an arrangement similar to that of said protocol quasi-terminating apparatus is further provided between said information processing terminal and said wireless line connection control apparatus.

4. A mobile communication system comprising:

an information processing center apparatus;

a switching station for controlling a connection of a wireless line;

a communication network for connecting said information processing center apparatus to said switching station;

a mobile station for performing a data communication via the wireless line between said switching station and the own mobile station;

a protocol quasi-terminating apparatus provided between said communication network and said switching station, for detecting as to whether or not a line connected between said communication network and said switching station is interrupted, and for quasi-terminating a protocol used to said communication network, and another protocol used to said mobile station in the case that said line is interrupted;

an information processing terminal for transmitting/receiving data between said information processing center apparatus and the own information processing terminal; and a wireless line connection control apparatus provided between said mobile station and said information processing terminal, for transferring to said mobile station an instruction to interrupt the wireless line between said switching station and said mobile station in the case that no data is transmitted/received between said information processing terminal and said mobile station, and also for transferring to said mobile station an instruction to connect said interrupted wireless line in the case that the data transmission/reception is commenced between said information processing terminal and said mobile station, wherein said wireless line connection control apparatus includes:

a transmit/receive data monitoring unit for duplicating data transmitted/received between said information processing terminal and said mobile station to output the duplicated data, and for transferring a line interrupt/connect instruction to said mobile station when said line interrupt/connect instruction is received;

a data communication present/not present judging unit for judging as to whether or not there is such transmit/receive data duplicated by said transmit/receive data monitoring unit; and a line connect/interrupt instructing unit for transmitting a line interrupt instruction to said transmit/receive data monitoring unit in the case that the detection result of said data communication present/not present judging unit indicates that no transmit/receive data is present, and also for transmitting a line connect instruction to said transmit/receive data monitoring unit in the case that the detection result of said data communication present/not present judging unit indicates that the transmit/receive data is present, and wherein said protocol quasi-terminating apparatus includes:

a mobile station-sided protocol terminating unit for judging as to whether or not the line between said communication network and said switching station is interrupted, and also for quasi-terminating a protocol used to said mobile station when a protocol termination instruction is entered to said mobile station sided protocol terminating unit;

a communication network-sided protocol terminating unit for quasi-terminating a protocol used to said communication network when a protocol termination instruction is entered into said communication network-sided protocol terminating unit; and a protocol terminating/matching control unit for transmitting a protocol termination instruction to both said communication network-sided protocol terminating unit and said mobile station-sided protocol terminating unit in the case that the detection result of said mobile station-sided protocol terminating unit indicates that the line is interrupted.

5. A mobile communication system as claimed in claim 2 wherein:

another protocol quasi-terminating apparatus having an arrangement similar to that of said protocol quasi-terminating apparatus is further provided between said information processing terminal and said wireless line connection control apparatus.

6. A mobile communication system as claimed in claim 1 wherein:

said communication network is a general-purpose line network;

and said mobile station is a portable telephone.

7. A mobile communication system as claimed in claim 2 wherein:

said communication network is a general-purpose line network;

and said mobile station is a portable telephone.

8. A mobile communication system as claimed in claim 3 wherein:

said communication network is a general-purpose line network;

and said mobile station is a portable telephone.

* * * * *